United States Patent [19]

Kurachi et al.

[11] Patent Number: 4,702,900

[45] Date of Patent: Oct. 27, 1987

[54] METHOD OF PRODUCING SILICON CARBIDE

[75] Inventors: Yasuo Kurachi, Kodaira; Katsuhiko Arai, Iruma; Hiroaki Wada, Tokyo; Yoji Watabe, Hachioji; Sanae Irako, Higashimurayama, all of Japan

[73] Assignee: Bridgestone Corporation, Tokyo, Japan

[21] Appl. No.: 849,281

[22] Filed: Apr. 8, 1986

[30] Foreign Application Priority Data

Apr. 8, 1985 [JP] Japan .................................. 60-73719
Oct. 23, 1985 [JP] Japan ............................... 60-236948

[51] Int. Cl.$^4$ ............................................ C01B 31/36
[52] U.S. Cl. ..................................... 423/345; 423/439
[58] Field of Search ................................. 423/345, 439

[56] References Cited

U.S. PATENT DOCUMENTS 4,504,453 3/1985 Tanaka et al. ...................... 423/345
4,536,379 8/1985 Carlson et al. ..................... 423/345

FOREIGN PATENT DOCUMENTS 0134100 10/1979 Japan .................................. 423/345

Primary Examiner—John Doll
Assistant Examiner—Lori S. Freeman
Attorney, Agent, or Firm—Birch, Stewart, Kolasch & Birch

[57] ABSTRACT

In a method of producing silicon carbide by heating starting materials comprising siliceous material and carbonaceous material in a non-oxidizing atmosphere, those ingredients contained in gases evolved upon heating and solidified at a low temperature into impurities for silicon carbide are eliminated from the atmosphere during heating.

9 Claims, 11 Drawing Figures

METHOD OF PRODUCING SILICON CARBIDE

BACKGROUND OF THE INVENTION

This invention concerns a method of producing silicon carbide (SiC) and, more specifically, it relates to a method of producing SiC containing few impurities.

DESCRIPTION OF THE PRIOR ART

Sintered SiC products have been noted as structural material used under high temperature because of their excellent heat resistance, low heat expansion coefficient and chemical stability and, in addition, sintered products of high density have particularly high strength under high temperature.

As the industrial method of producing SiC powder for use in sintering to obtain such sintered SiC products, there have been known the following two methods.

(1) A method (Acheson method) of mixing silica as a silicon source, carbon, coal, etc. as a carbon source and saw dust for facilitating the removal of gaseous carbon dioxide generated in the production step, supplying an electrical current to increase the temperature higher than 2000° C., synthesizing SiC ingots and then pulverizing and purifying the ingots to obtain SiC powder for use in sintering.

(2) A method of charging a mixture of silica as a silicon source and carbon as a carbon source into a vertical or lateral type pusher furnace, synthesizing SiC and applying decarbonization, pulverization and purification to obtain SiC powder for use in sintering.

Of the above-mentioned two methods, the method (1) has mainly been used for the synthesis of α-SiC. The method (2) has mainly been used for synthesizing β-SiC, in which the time required for pulverization can be shortened as compared with the method (1) since the grain size of the obtained SiC is smaller.

However, impurities have inevitably been incorporated into the products and it has been much laborious to remove them in any of the conventional methods as described above. That is, when starting material containing siliceous and carbonaceous materials are heated and fired in a non-oxidizing atmosphere, gases containing Si, SiO, etc. are evolved at a temperature region from 1450° to 2100° C., and Si, SiO, etc contained in the gases are incorporated into the reaction product SiC through solidification (e.g. sublimation) during cooling after the firing to thereby reduce the SiC purity.

As a countermeasure for preventing the inclusion of Si or SiO, use of excess carbon has been conducted in the production method (2) as described above. By the use of excess carbon, the amount of free Si or SiO is decreased through the reaction:

Si+C→SiC, or

SiO+2C→SiC+CO, by which the incorporation of Si or SiO can be suppressed.

However, the addition of excess carbon reduces the processability upon blending the starting material and, thus, is not always advantageous in the industrial method.

Further, as has been described above, SiC powder has two crystal forms, (i.e., α and β forms) and there have been known method of producing them such as through reaction between $SiO_2$ and C; Si and C; and gas phase synthesis from Si compounds and hydrocarbons. Among them, the method of reacting $SiO_2$ and C has been utilized industrially for the production of SiC powder since it has a merit in view of the low cost for the starting materials, ease of the reaction procedures, etc.

A synthetic method of an Acheson furnace is well-known as the method through the reaction of $SiO_2$ and C. The product obtained by this method is lumpy SiC, which requires a long period of time for the pulverization. In view of the above, there have been made various improvements for the method using the reaction of $SiO_2$ and C in recent years, and a synthetic method for β-SiC fine powder through continuous production has also been proposed. This method utilizes the following reaction I or II at high temperature:

$$SiO_2 + 3C \longrightarrow SiC + 2Co\ (g) \qquad \text{I}$$

$$\left. \begin{array}{l} SiO_2 + C \longrightarrow SiO\ (g) + CO\ (g) \\ SiO\ (g) + 2C \longrightarrow SiC + CO\ (g) \end{array} \right\} \qquad \text{II}$$

where (g) represents gaseous product.

Heretofore, various studies have been made on the method of mixing and solidifying solid siliceous material and carbonaceous material for the continuous production of fine β-SiC powder. For instance, Japanese Patent Publication No. 18325/1983 discloses that continuous production is possible with no adherance of a solidified mixture comprising siliceous material and carbonaceous material with each other, by preparing a solidified product using a binder capable of carbonization at a high temperature range such as pitch and applying heat treatment at a temperature higher than 400° C.

In addition, as a further improvement to the method disclosed in Japanese Patent Publication No. 18325/1983, a method of using a large excess of carbonaceous material with an aim of efficient utilization of SiC produced in the reaction of the formula II has been proposed in Japanese Patent Publication No. 34405/1983.

Referring to the reaction temperature upon producing SiC, a reaction temperature generally from 1400° to 2000° C. has been disclosed in the thermodynamic point of view and a temperature range from 1400° to 1600° C. has been recommended based on the consideration regarding the reaction mechanisms between $SiO_2$ and C. The lower limit for the preferred reaction temperature is determined depending on the reaction rate in preparing SiC, while the upper limit thereof is determined depending on the growing rate of crystal grains. Referring particularly to the upper limit, it is considered undesirable for the purpose of attaining fine powderization to conduct the reaction at a temperature higher than 1600° C.

While on the other hand, for the reaction device producing SiC through reduction of $SiO_2$, a vertical type pusher furnace has been used since it is simple in the structure, advantageous in the manufacture of and the maintenance of the facility and it can enable continuous production.

However, it has been impossible to produce fine and easily sinterable SiC powder with an industrial advantage by any of the foregoing conventional methods.

For instance, the merit obtained by the use of the binder mentioned in the method as described in Japanese Patent Publications Nos. 18325 and 34405/1983 means nothing but the prevention of adherance between each of the mixed solidification products. As a result, free carbon is contained as much as 20% or more in the SiC produced to bring about a problem of removing such free carbon after the synthesis of SiC as apparent from examples in Japanese Patent Publication No. 34405/1983.

For eliminating free carbon, although a method of burning to remove carbon at a low temperature in an oxidizing atmosphere has generally been employed, the $\beta$-SiC powder as the main product is partially oxidized to produce $SiO_2$ as impurities. Thus, use of the excess carbon source with an aim of decreasing free SiO gas or completing the reaction of $SiO_2$ results in the formation of $SiO_2$ which gives an undesired effect on sintering. In view of the above it has been necessary to provide an additional cleaning step using a mixed acid of fluoric acid and nitric acid mainly for the elimination of $SiO_2$, subsequent to the free carbon eliminating step.

Further, the vertical type pusher furnace having been used as the reaction device for the production of SiC involves the following drawbacks:

(1) Since the reaction zone is arranged vertically in series, most of the impurities stay in the reaction zone and remain in the product.

(2) Recovery of CO gas is difficult.

(3) SiO as the intermediate gaseous reaction product is deposited at a low temperature region of the reaction vessel to bring about a difficulty for the control of the operation conditions.

(4) Since the material charging port and the product take-out port are arranged vertically in series, starting materials are liable to be incorporated into the product making it difficult to obtain SiC powder of high purity.

SUMMARY OF THE INVENTION

The object of this invention is to provide a method of producing silicon carbide containing few impurities.

The foregoing object of this invention can be attained in accordance with this invention by a method of producing SiC by heating a starting material containing siliceous material and carbonaceous material in a non-oxidizing atmosphere, wherein gases by-produced upon reaction at a high temperature from 1450° to 2100° C. and solidified at the low temperature to form impurities in SiC are separated from the atmosphere during reaction at a high temperature.

Specifically, the present inventors have made a specific study on the synthesis of SiC through the following formulas III–VI and, as a result, have accomplished this invention based on the finding that SiC of high purity can be synthesized by eliminating those ingredients (SiO, Si, etc.), which are gaseous at a high temperature region during firing reaction under heating, for example, from 1450° to 2100° C. and solidified at a low temperature, from the reaction atmosphere:

$SiO_2 + C \rightarrow SiC + CO$   III $SiO + C \rightarrow Si + CO$   IV $Si + C \rightarrow SiC$   V or $SiO + 2C \rightarrow SiC + CO$   VI Therefore, by the method of producing silicon carbide according to this invention, since a device capable of skillfully eliminating impurities contained in by-produced gases evolved during reaction at a high temperature is utilized, the following effects can be attained:

(1) No contaminations are observed in the silicon carbide produced, (2) Deposition of impurities in the furnace can be prevented, etc.

In this case, easily sinterable $\beta$-silicon carbide of high purity having crystallite sizes larger than 500 Å can be obtained upon preparing silicon carbide from a mixture composed of siliceous and carbonaceous materials, by firing a mixture having the atomic ratio C/Si between carbon atoms or silicon atoms lies in a range: $2.1 < C/Si < 3.0$ at a high temperature between 1750° C. and 2100° C. in a device capable of eliminating the by-produced gases out of the system.

The U.S. patent application Ser. No. 746,033 has disclosed that there is a close relationship between the crystallite size of SiC crystals and the sinterability thereof. According to the disclosure, the sinterability is improved as the crystallite size of crystals is larger, by which the amounts of boron and carbon added as an additive or sintering aid upon sintering can be decreased.

Prior to the U.S. patent application Ser. No. 746,033 as described above, no fundamental and complete studies have been made for the starting powder used in the production of sintered products and for other reaction conditions. Then, although many patent applications have been proposed for the sintering of $\beta$-SiC, and various boron addition amounts are disclosed, there are no examples capable of actually obtaining preferred sintered products with the boron addition amount of less than 0.3% by weight and it has been extremely difficult to sinter SiC with the addition amount of less than 0.3% by weight unless special considerations are taken for the sintering conditions. It is considered that since the $\beta$-SiC powder produced by the prior art method, as described above has incomplete crystallinity, it has been impossible to produce a preferred sintered silicon carbide product of high density.

In view of the above, the present inventors have made a specific study on the synthesis of $\beta$-SiC and, as a result, discovered the following facts:

(1) A process for eliminating free carbon after the reaction is no longer required by setting the atomic ratio C/Si between carbonaceous material and siliceous material to a range:
C/Si<3, which is smaller than the stoichiometrical amount:
C/Si=3 as derived from the following equation:

$SiO_2 + 3C \rightarrow SiC + 2CO$ and, as a result, the $SiO_2$ eliminating process using poisonous strong acid can be saved, (2) the crystallite size of the resultant powdery product can be increased as a result of setting the reaction temperature as high as 1750° C. or more and easily sinterable $\beta$-SiC powder that can be sintered sufficiently with an additional amount of boron as the additive of less than 0.3% by weight can be synthesized, and (3) the deposition and incorporation of by-produced gases into the product can be prevented by the combination of a high temperature as described in (2) above and a device capable of eliminating the by-produced gases out of the system, thereby obtaining β-SiC powder of high purity.

DESCRIPTION OF THE ACCOMPANYING DRAWINGS

These and other objects, features, as well as advantageous effects of this invention will now be made more clear by reading the following descriptions for preferred embodiments in conjunction with the accompanying drawings, wherein

FIG. 7 is a view showing the powder X-ray diffraction pattern for commercially available β-SiC powder and a result of the waveform analysis thereof; wherein, FIG. 7(a) shows the powder X-ray diffraction pattern for commercially available β-SiC powder having a crystallite size of more than 420 Å and less than 500 Å and FIG. 7(b) shows the powder X-ray diffraction pattern for commercially available β-SiC powder having a crystallite size less than 350 Å and FIGS. 8 and 9 are views showing the powder X-ray diffraction pattern for β-SiC powder obtained in Example 1 and a result of the waveform analysis thereof, respectively.

DESCRIPTION OF THE PREFERRED EMBODIMENT

This invention provides a method of producing silicon carbide by heating starting material comprising siliceous material and carbonaceous material in a non-oxidizing atmosphere, wherein those ingredients contained in gases evolved during heating and solidified at a low temperature to form impurities in the silicon carbide are eliminated from the atmosphere during heating.

In this invention, those ingredients to be eliminated from the atmosphere during firing reaction are mainly Si and SiO. Since Si and SiO are readily solidified at a temperature lower than 1450° C., those ingredients solidified at a low temperature as impurities for the silicon carbide are preferably eliminated from the atmosphere in a temperature region higher than 1450° C. Further, since the upper limit for the SiC firing temperature is usually of about 2100° C., the upper limit for the temperature in the eliminating procedures is usually set to about 2100° C.

Siliceous material usable in this invention can include, for example, silica represented by $SiO_2$ in the chemical formula, and referred to as silica rock, silica sand or molten silica in the common name of minerals or commercial goods.

The carbonaceous material usable herein can include carbon, coal, coke, synthetic hydrocarbon resin or the like.

The starting materials mentioned above are shown only for examples and it is of course possible to use the other siliceous and carbonaceous materials as a starting materials in this invention.

When the siliceous and carbonaceous starting materials are blended in this invention, the molar ratio between $SiO_2$ and C is not always restricted to the 1:3 stoichiometrical ratio. If carbon is used in a slight excess, SiC and C contained in the product may be separated to purify by utilizing the difference in the specific gravity or the like. If the amount of carbon is set to less than the stoichiometrical ratio, excess Si may be eliminated at a temperature from 1450° to 2100° C. A desired molar ratio is within a range: $SiO_2/C=1/2.1-1/3.0$.

While there have been proposed various types of continuous production devices for SiC, any device may be used so long as it has a facility of eliminating by-produced gases at 1450°–2100° C. as described above. A lateral type pusher furnace capable of easily separating the reaction furnace and the product cooling section is desired. For instance, a reaction furnace having a separate chamber capable of increasing the temperature to a region from 1450°–2100° C. and capable of according by-produced gases and a cooling zone for the recovery of the product are disposed separately, in which the by-produced gases are recovered in the separate chamber of the reaction zone so that they may not intrude into the cooling zone.

One example of a furnace suitable to practicing the method according to this invention will be shown below.

Figure 1:
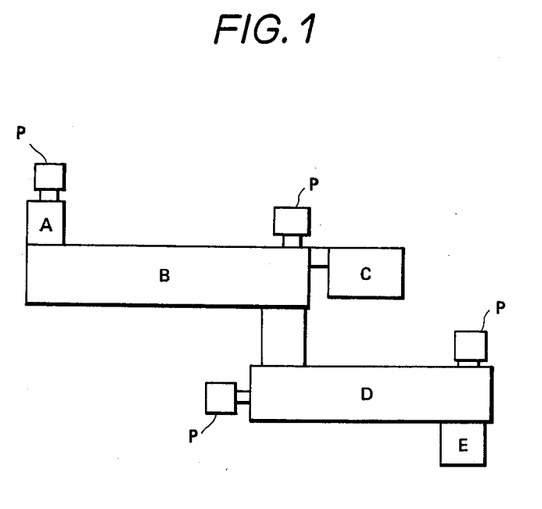
FIG. 1 is a schematic plan view for the constitution of the device suitable to practicing the method according to this invention.

FIG. 1 is a view showing the constitution of a lateral type pusher furnace suitable to practicing the method according to this invention.

In the drawing, are shown a pusher mechanism P, an atmosphere replacing chamber also serving as a sample inlet A, a heating reaction furnace section B, a by-produced gas recovery section C, a cooling chamber D and a sample take-out port E respectively. The starting material placed in a box-like vessel is inserted at the portion A, and then pushed out by the pusher mechanism to B, D and E successively. The by-produced gas recovery section C is disposed behind the heating reaction furnace section B and adapted such that impurity ingredients are not intruded into the section D. That is, a suction is performed in the section C at a pressure somewhat reduced by the gas amount evolved in the section B to separate impurities therein. The impurity-free by-produced gases, for example, CO may also be discharged as they are for the burning treatment but they may be recycled into the section B as the non-oxidizing atmosphere gas.

When producing the silicon carbide from a mixture comprising siliceous material and carbonaceous material for obtaining β-SiC by utilizing the above-mentioned method, a mixture comprising carbon atoms and silicon atoms at an atomic ratio C/Si in a range: $2.1<C/Si<3.0$ is fired at a high temperature between 1750° to 2100° C. in a device capable of eliminating the by-produced gases out of the system to obtain β-silicon carbide powder of high purity having crystallite size of greater than 500 Å.

The method according to this invention will further be described more in detail.

The siliceous material used as the starting material in the method of producing β-SiC of high purity can include, for example, (1) a series of solid compounds represented by the chemical formula: $SiO_2$ such as silica powder, amorphous silica and quartz sand, (2) a series of liquid compounds such as (a) those obtained from the aqueous solution of alkali silicate through acid decomposition or alkali elimination, for example, silicic acid polymer obtained by eliminating alkali from water glass.

(b) a series of polymers obtained by trimethylation of hydrolyzable silicic acid compounds.

(c) esters of hydrolyzable silicic acid compounds with organic compounds or organic metal compounds, for example, ethyl silicate and polymers thereof synthesized through the reaction of silicon tetrachloride and ethanol, and (d) reaction products of hydrolyzable silicon compounds and organic compounds; and (3) mixtures of (1) and (2) described above. Among them, quartz sand, silica sand, ethyl silicate, etc. are preferred and, particularly, ethyl silicate and polymers thereof are preferred in view of the reactivity at high temperature.

The carbonaceous materials usable herein can include, preferably, various types of carbon blacks, natural graphite, petroleum, cokes and coal powders which are pulverized and applied with treatment for high purity. In the case of pelletizing the mixtures and reacting them at high temperature, tar pitches or heat-improved petroleum pitches, etc. are also be used.

Also those usable herein can include those materials forming free carbon in a non-oxidizing atmosphere at a temperature higher than 1000° C., for example, those liquid organic compounds forming carbon under heating, particularly, those organic compounds with high residual carbon ratio and capable of polymerization or crosslinking with the aid of catalyst or under heating, specifically, those resins such as phenol resin, furan resin, polyimide, polyurethane, polyacrylonitrile, as well as those carbonized products prepared by heat treating cellulose, sucrose, pitch, tar, etc. Among the organic compounds as described above, phenol resin, furan resin, polyimide, and polyurethane are preferred, with the phenol resin being most preferred in view of the high residual carbon ratio after heating. The phenol resin may be any of resol type phenol resin as a condensate of phenol and formaldehyde which is solidified by way of an acid catalyst or under heating or novolac type phenol resin solidified by way of an alkali catalyst or under heating.

For obtaining $\beta$-SiC of high purity and of large crystallite size in this invention, it is important that the siliceous material and the carbonaceous material are mixed uniformly so that the siliceous and carbonaceous materials remain in a homogenized and closely contact state just before the formation of SiC.

As a preferred method for attaining such a uniform mixing, there is a method of using a liquid organic compound such as a phenol resin which is the precursor of carbon as the carbonaceous material, uniformly mixing therein the siliceous material previously, curing them through polymerization or crosslinking under the presence of a catalyst and then heating to carbonize to obtain a curing product. In this case, the carbonization is usually carried out in an inert gas atmosphere at a temperature from 500° to 1400° C. The treatment is properly applied depending on the ingredients constituting the curing product and it is of course possible to apply other treatment with no restriction to the heating treatment as described above. Alternatively, the material can be served directly to the heat treatment for synthesizing SiC without such pre-treatment.

In this invention, the ratio of the starting materials for the synthesis of $\beta$-SiC is determined based on the atomic ratio between Si and C in the product obtained by treating a solidification product adjusted by mixing them in a non-oxidizing atmosphere at a temperature from 800° to 1400° C. It is preferred to determine the mixing ratio for the carbonaceous material and the siliceous material such that the atomic ratio between C and Si in the product obtained by such treatment lies within a range: $2.1 < C/Si < 3.0$, preferably, $2.4 \leq C/Si \leq 2.8$.

The theoretical atomic ratio C/Si in the SiC synthesis is 3. If C/Si ratio is greater than 3.0, carbon remains by more than 1% by weight in the SiC powder as the product and elimination of carbon is necessary as described above for sintering the powder under normal pressure. While on the other hand, if the atomic ratio C/Si is less than 2.1, the SiC yield is significantly worsened which is economically undesired. In view of the above, the C/Si ratio is defined as within a range: $2.1 < C/Si < 3.0$ in this invention. By setting the ratio as: $2.4 \leq C/Si \leq 2.8$, $\beta$-SiC of high purity can be obtained at a high yield and with a reduced residual carbon, which is extremely advantageous. The treatment at a temperature from 800° to 1400° C. in the non-oxidizing atmosphere as described above is carried out for determining the atomic ratio and it is not always necessary for the SiC synthesis.

In this invention, the mixture of the starting material as described above is fired at a high reaction temperature from 1750° to 2100° C. in a device capable of eliminating the by-produced gases out of the reaction system. In such a high temperature reaction, firing within a short period of one hour is possible.

The object of this invention can also be attained at a reaction temperature lower than 1750° C. if the reaction is carried out for a long period of time more than one hour. However, in the case of using quartz sand, for example, as the starting material, if the reaction temperature is set lower than 1713° C., which is the melting point of the quartz sand as the starting material, unreacted quartz sand may possibly be remained undesirably. On the other hand, if the reaction temperature exceeds 2100° C., the grains grow significantly to take much time for the pulverization, which is economically undesired. In addition, a high temperature than required is not preferred also in energy saving point of view. It is particularly suitable to set the reaction temperature within a range from 1800° to 2000° C.

Preferred devices capable of eliminating by-produced gases are those:

(1) having a sub chamber maintained at a temperature higher than 1400° C. disposed to a conventional lateral type pusher furnace and having a function capable of treating by-produced SiO gas, and (2) having a function of directing the flow of the inert gas toward the sub-chamber in (1) as described above for preventing the intrusion of by-product to the main product.

Figure 2:
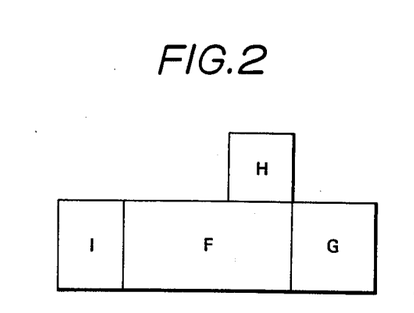
FIGS. 2 through 5 are, respectively, schematic plan views for the constitution of improved lateral type pusher furnaces suitable to practicing this invention.
Figure 3:
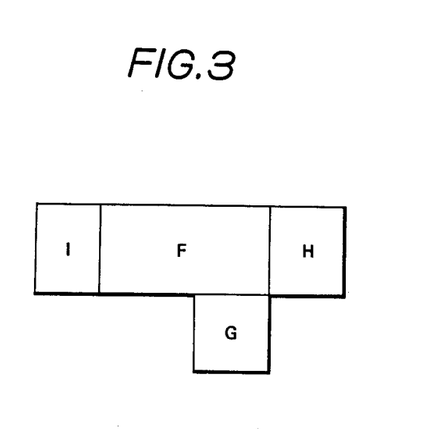
Figure 4:
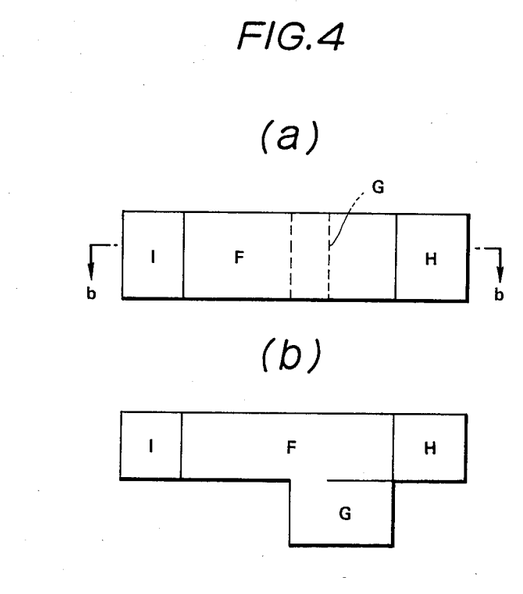
Figure 5:
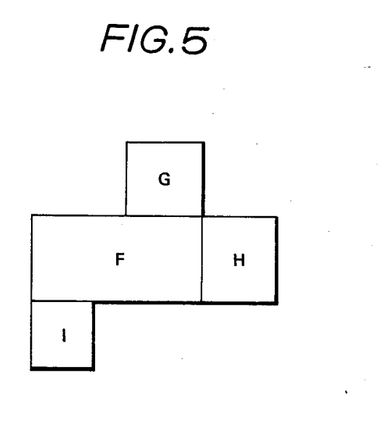

That is, although a straight structure has been employed in the conventional lateral type pusher furnace so as to simplify the structure, it is preferred in this invention to improve the conventional furnace into the structures as described in (1)–(4) below;

(1) a device in which a material charging port I is disposed on the same line as a reaction synthesis chamber F and a cooling chamber G, and a sub-chamber (by-produced gas treating chamber) H is disposed laterally to the reaction synthesis system F (FIG. 2), (2) a device in which a starting material charging port I, a reaction synthesis chamber F and a sub-chamber H are disposed on the same line and a cooling chamber G is disposed laterally at the final end of the reaction synthesis chamber F by way of a door (FIG. 3), (3) a device in which a starting material charging port I, a reaction synthesis chamber F and a sub-chamber H are disposed on the same line (FIG. 4(a)), and a cooling chamber G is formed with a step to the lower portion at the final end of the reaction synthesis chamber F (FIG. 4 (b)), (4) a device in which a reaction synthesis chamber F and a sub-chamber H are disposed on the same line and a starting material charging port I is disposed laterally to the top end of the reaction synthesis chamber F, while the cooling chamber G is disposed laterally at the final end of the reaction synthesis chamber F opposing orthogonally to the charging port (FIG. 5).

Further, the device having the constitutions of the devices (1)–(4) in combination is also preferred.

In the constitution of the device as described in (1)–(4) above, a partitioning structure capable of preventing the intrusion of by-produced gases and saving energy not escaping the heat from the reaction system is disposed between the reaction synthesis chamber F and the cooling chamber G in the structure (1) and (2) above. The constitution in (2) in which the sub-chamber H is disposed at the final end of the reaction synthesis chamber is useful for the saving of heating energy in the sub-chamber H. Further, the constitution in (3) of positioning the cooling chamber G below the reaction synthesis chamber F can prevent the SiO gas from intruding into the cooling chamber more completely. Furthermore, the constitution in (4) of disposing the material charging port I laterally provides a large energy-saving effect.

The reaction atmosphere in such an improved lateral type pusher furnace is preferably a non-oxidizing atmosphere such as of vacuum of helium, argon or carbon monoxide and more preferably, the non-oxidizing gas is caused to flow from F to H and/or from G to H in order to efficiently promote the removal of the by-produced gases.

In this way, $\beta$-silicon carbide of high purity having crystallite size of larger than 500 Å and, mostly, larger than 700 Å can be obtained with ease by firing the mixture comprising carbon atoms and silicon atoms at an atomic ratio C/Si within a range: $2.1 < C/Si < 3.0$ at a high temperature from 1750° to 2100° C. and in a device capable of eliminating by-produced gases out of the system in accordance with this invention.

Although this invention has been described with respect to the method of producing $\beta$-SiC of high purity, this invention is also applicable to the production of $\beta$-SiC powder in which hetero atoms are intensionally solid-solubilized. That is, if a compound containing hetero atoms, for example B and Al is added in the conventional method, and if the molar ratio C/Si is greater than 3 and excess C is present, B, Al or the like added for the purpose of solid-solubilization undesirably forms a compound with C. However, according to this invention, since the molar ratio lies within a range: $C/Si < 3$, a production method with the reduced formation of by-products can also be provided for the aim of solid-solubilization of hetero atoms.

The method of measuring the crystallite size referred to this invention will now be described.

Powder is usually composed of many primary particles. As the primary particles become intact, the free energy of the system can be decreased to facilitate the sintering. While the direct measurement for the size of the primary particles is conducted by the use of an electron microscope, the size of the primary particles can simply be forecast based on the crystallite size measured by the powder X-ray diffractometry.

As is well-known, the absorption width obtained in the measurement by the powder X-ray diffractometry is increased as the thickness of the crystals is decreased. By utilizing this nature, the crystallite size can be determined from the diffraction curve. The following equation known as the Scherrer's equation is used for determining the crystallite size:

$$t = \frac{0.9\lambda}{B \cos\theta_B} \quad (A)$$

In equation A, B represents the width of the diffraction curve at a height one-half of the maximum strength which is represented by radian. $\lambda$ is a wavelength for the X-ray and $\theta_B$ is $\frac{1}{2}$ for the value of reflection angle $(2\theta)$ at the reflection curve.

By the way, there are no X-beams which are actually monochromic in the strict meaning. For instance, in the use of Cu-$K_\alpha$ rays as the X-ray, two types of reflections: $K_{\alpha 1}$, $K_{\alpha 2}$ are observed. Accordingly, care has to be taken for determining B in the equation (A) above. That is, in the diffraction peak at the lower angle side, since the difference in the reflection peaks between $K_{\alpha 1}$ and $K_{\alpha 2}$ is small, a single absorption is usually observed. However, upon measuring on the greater angle side, the reflection peaks of $K_{\alpha 1}$ and $K_{\alpha 2}$ are separately observed. However, in the case of $\beta$-SiC with small crystallite sizes, the reflection peaks at $K_{\alpha 1}$ and $K_{\alpha 2}$ may not sometimes be separated even on the greater angle side. In view of the above, it is advantageous for determining B after always separating $K_{\alpha 1}$ and $K_{\alpha 2}$.

The present inventors have employed the following method. Specifically, the reflection at (420) face which is the reflection from the larger angle side of $\beta$-SiC powder is subjected to computerized waveform analysis to separate $K_{\alpha 1}$ and $K_{\alpha 2}$ and thereby to measure B. Si is used as an internal standard for the measurement of $\theta_B$. One example is shown in FIG. 6.

Figure 6:
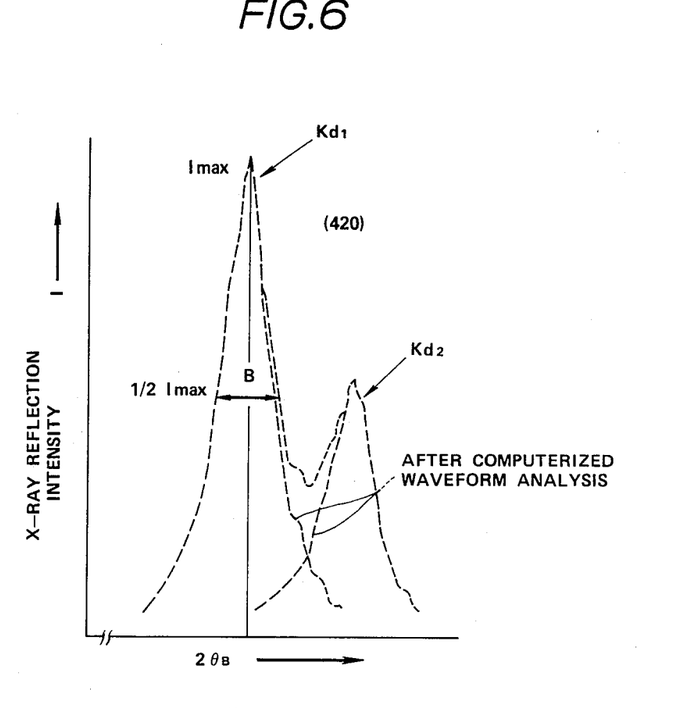
FIG. 6 is a view showing the powder X-ray diffraction pattern for β-SiC powder with the crystallite size of 640 Å and a result of the waveform analysis thereof.
Figure 7:
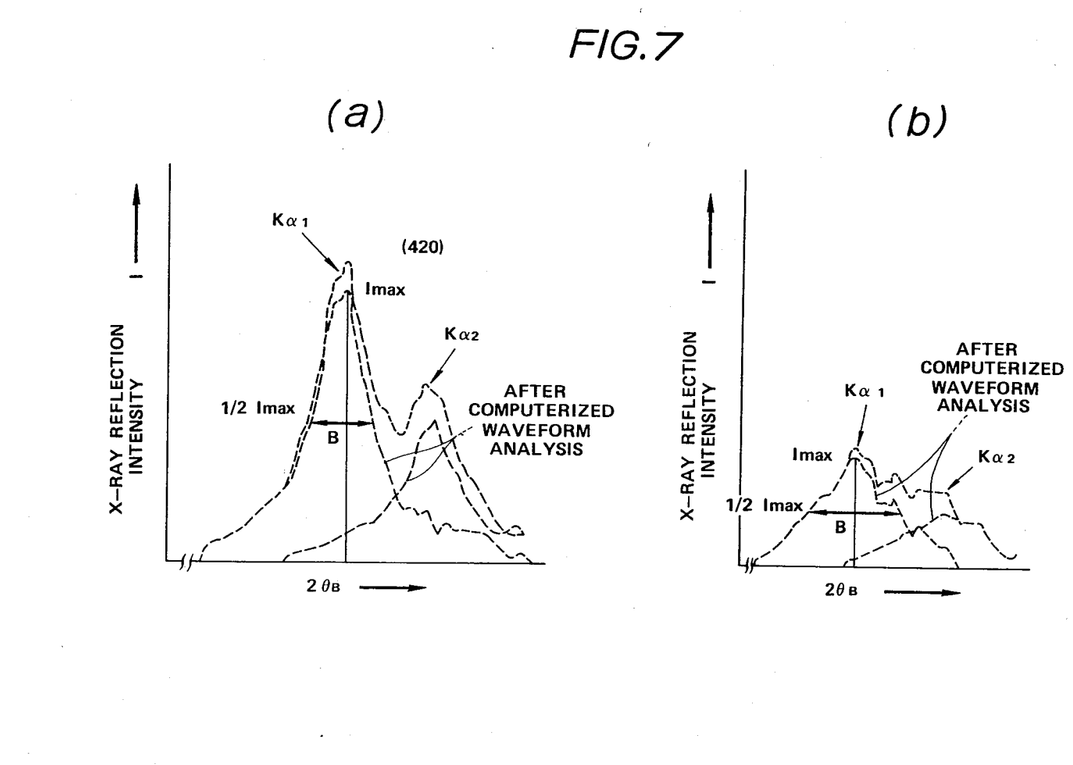

FIG. 6 shows an example of $\beta$-SiC powder with the crystallite size of 640 Å synthesized by the method of silica reduction. As shown in FIG. 6, after separating $K_{\alpha 1}$ and $K_{\alpha 2}$, B is measured. FIG. 7 shows an example of reflection at the (420) face of commercially available $\beta$-SiC wherein FIG. 7(a) shows the powder X-ray diffraction pattern for commercially available $\beta$-SiC powder having a crystallite size of more than 420 Å and less than 500 Å and a result of the waveform analysis thereof; and FIG. 7(b) shows the powder X-ray diffraction pattern for commercially available $\beta$-SiC powder having a crystallite size of less than 350 Å and a result of the waveform analysis thereof. The measuring condition used in FIGS. 6 and 7 are scanning speed of $\frac{1}{4}°$ C./min, time constant of 4 and chart feeding speed of 20 mm/min. The crystallite size can be determined with good reproducibility with 2 digits of significant figures when measuring under a preferred S/N ratio condition.

While the powder having the crystallite size larger than 500 Å as measured in this way is sufficiently powderous, it is desired to further apply pulverization to reduce the average grain size to less than 1 $\mu$m in order to improve the performance of the sintered product. In this case, ball mill, attritor, jet mill or the like may be used as the pulverizing device. Upon pulverization, since SiC powder just after the pulverization is extremely active and readily reacts with oxygen to form oxides on the surface of powder, pulverization may desirably be conducted in order to avoid this in an inert gas atmosphere such as nitrogen, argon and carbon-monoxide.

The thus obtained fine β-SiC powder is a easily sinterable powder which can be sintered well by the addition of boron of less than 0.3% by weight and the addition of carbon of less than 4% by weight as the additive.

The boron source for use as the additive can include any of those compounds containing boron, and $B_4C$, BN and amorphous boron are particularly preferred. Further, as the carbon source, carbon powder, charcoal material, pitch, tar and those organic compounds with high carbon residual rate represented by phenol resins are preferred.

As described above, the process for eliminating free carbon after the reaction is no longer required by defining the atomic ratio C/Si between carbon and silicon in the starting mixture to $2.1 < C/Si < 3.0$ and, as a result, it is possible to save the $SiO_2$ eliminating process using noxious strong acid.

Further, as a result of setting the reaction temperature as high as from 1750° to 2100° C., the reaction temperature can be shortened and the crystallite size in the powder product can be increased, thereby enabling to synthesize easily sinterable β-SiC powder that can be sintered sufficiently with a less addition amount of the additive.

Furthermore, by the combination of a high reaction temperature of 1750° to 2100° C. and the device capable of eliminating by-produced gases out of the system, deposition and incorporation of the by-produced gases in the product can be prevented to obtain SiC powder of high purity.

This invention will now be described more specifically referring to examples and comparative examples but this invention is no way limited only to the following examples so long as it lies within the scope of the invention.

EXAMPLE 1

100 g of ethyl silicate containing 41% by weight of $SiO_2$ compound as the siliceous material, 29.05 g of a phenol resin as the organic compound forming carbon under heating as the carbonaceous material and 17 g of an acid catalyst diluted with water were added and mixed uniformly under vigorous agitation. When standing still for about 15 minutes after the stirring, the mixture was solidified to obtain a solid product. The solid product thus obtained was heated to 1000° C. at a 10° C./min rate in a non-oxidizing atmosphere. The solid product after the heat treatment (hereinafter referred to as a carbonization precursor) was analyzed for carbon by using a catalyst in a carbon analyzer to determine the C and Si atomic ratio to be 2.18.

When the carbonization precursor was fired in an improved lateral type pusher furnace of the structure as shown in FIG. 4 in a non-oxidizing atmosphere at 1900° C. for 30 minutes, β-SiC powder of the following properties was obtained.

Figure 8:
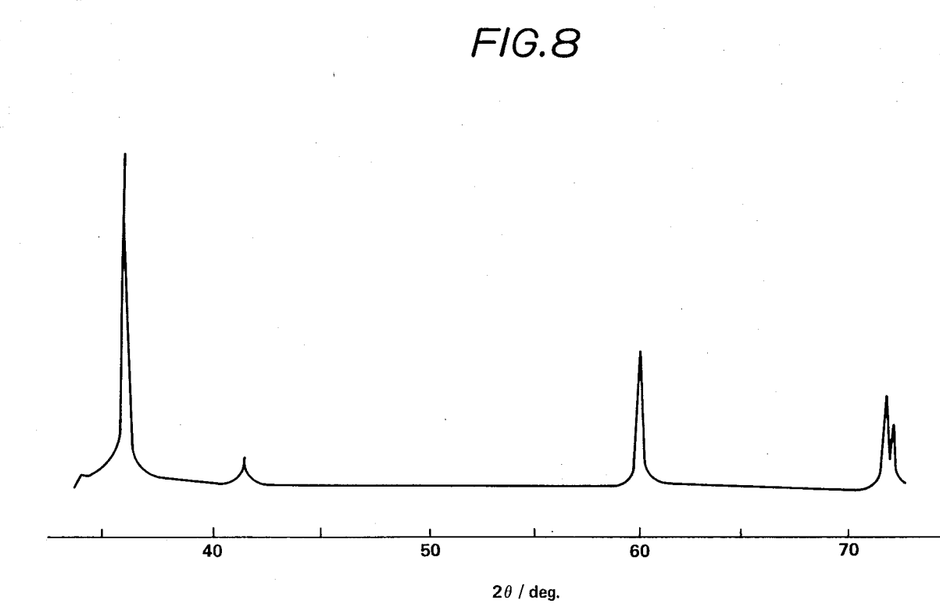
Figure 9:
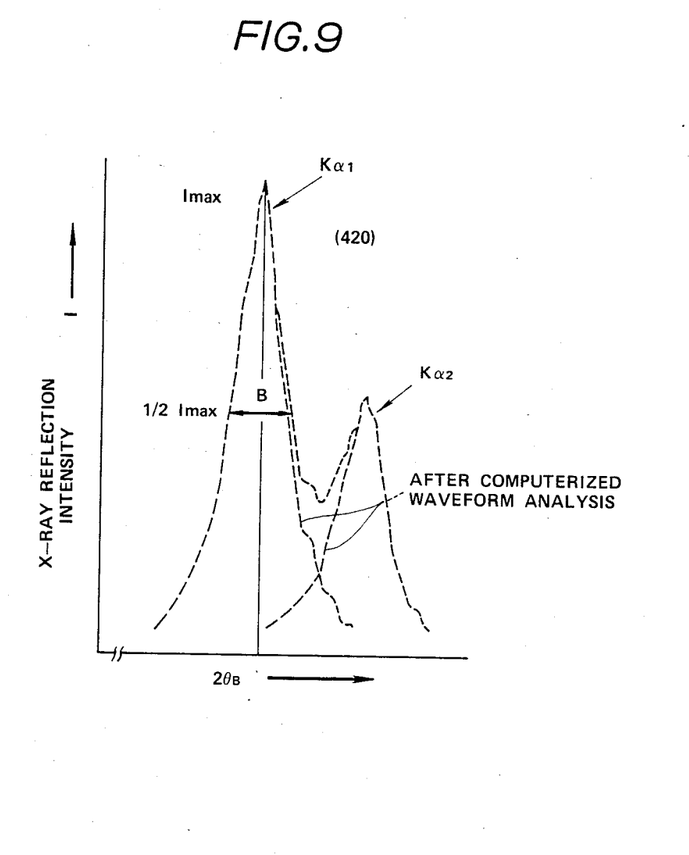

The analyzed diagram for the powder measured by the powder X-ray analysis is as shown in FIG. 8. Further, the analysis diagram at the (420) face measured at the scanning rate of ¼° C./min, time constant of 4 and chart feed speed of 20 mm/min for the measurement of the crystallite size was subjected to computerized waveform analysis to obtain the result as shown in FIG. 9. The crystallite size is also shown below.

Properties of β-SiC powder (Example 1)

| True specific gravity | | 3.19 g/cm³ |
|---|---|---|
| Crystal form | β-type | |
| Impurity (wt %) | C | 0 |
| | Al | 0.0035 |
| | Fe | 0.0004 |
| | Na | 0.0008 |
| | $SiO_2$ | 0.002 |
| Crystallite size at (420) face | | 716Å |

EXAMPLE 2, COMPARATIVE EXAMPLES 1-3

The SiC powder was produced in the same procedures as in Example 1 except that the carbonization precursor with the C/Si atomic ratio as shown in Table 1 was synthesized while changing the blending ratio of the starting materials.

The properties of the SiC powder obtained are shown in Table 1.

In Comparative Example 1, the yield of the SiC obtained was as low as 35% and Si deposition was observed in the furnace. Further, in Comparative Example 2, starting carbon partially remained as impurities in the produced SiC, and carbon had to be removed. Furthermore, in Comparative Example 3, the crystallite size in the obtained SiC was small and excess carbon remained as impurities.

COMPARATIVE EXAMPLE 4

SiC powder was produced in the same procedures as in Example 1 except that the carbon precursor with the C/Si atomic ratio of 2.46 was synthesized while changing the blending ratio of the starting materials and then fired at 1600° C.

The properties of the SiC powder obtained are shown in Table 1.

The crystallite size in the obtained powder was small and unreacted carbon remained undesirably as impurities.

EXAMPLES 3-5, COMPARATIVE EXAMPLE 5

SiC powder was prepared in the same procedures as in Example 1 except that the carbon precursor with the C/Si atomic ratio of 2.46 was synthesized while changing the blending ratio of the starting materials and fired at a temperature shown in Table 1.

The properties of the SiC powder obtained are shown in Table 1.

Further, the thus obtained SiC powder was subjected to jet mill pulverization in argon to obtain a powder product with a narrow grain size distribution and the average grain size shown in Table 1 and sintered at normal pressure while adding 2% carbon and 0.2% boron as the additive to the powder product. The density of the sintering product thus obtained is shown in Table 1.

TABLE 1

| Example | | Carbonization precursor C/Si (atomic ratio) | SiC firing temperature (°C.) | SiC powder produced | | | | Grain size after pulverization (μ) | Sintered product density (g/cm³) |
| --- | --- | --- | --- | --- | --- | --- | --- | --- | --- |
| | | | | Crystal system | Crystallite size at (420) face | Impurity (wt %) C | Impurity (wt %) SiO₂ | | |
| Example | 1 | 2.18 | 1900 | β-type | 716 | 0 | 0.002 | — | — |
| | 2 | 2.80 | " | " | 680 | 0 | 0.002 | — | — |
| | 3 | 2.46 | 1800 | " | " | 0 | 0.002 | 0.8 | 3.10 |
| | 4 | " | 1900 | " | 700 | 0 | 0.002 | 0.7 | 3.15 |
| | 5 | " | 2000 | " | 890 | 0 | 0.002 | 0.8 | 3.12 |
| Comparative Example | 1 | 2.00 | 1900 | " | 574 | 0 | 0.003 | — | — |
| | 2 | 3.00 | " | " | 570 | 5.00 | 0 | — | — |
| | 3 | 3.83 | " | β,α-type | 340 | 33.95 | — | — | — |
| | 4 | 2.46 | 1600 | " | 280 | 5.25 | — | — | — |
| | 5 | " | 1700 | " | 300 | 0.02 | 0.002 | 0.6 | 2.85 |

EXAMPLE 6

100 g of silica powder as the siliceous material, 40 g of carbon black as the carbonaceous material, 32 g of resol-type phenol resin and 5 g of acid catalyst were mixed in water-methanol solution. They were dried on a hot plate for about one hour to solidify. The thus obtained solid product was heated to a temperature of 1000° C. at a rate of 10° C./min in a non-oxidizing atmosphere. When the thus obtained carbonized product was analyzed for carbon, C/Si atomic ratio was 2.8.

When the carbonized product was fired in a non-oxidizing atmosphere at 1900° C. for 30 minutes, a β-SiC powder product having the following properties was obtained.

| | |
| --- | --- |
| True specific gravity | 3.19 g/cm³ |
| Crystal form | β-type |
| Impurities (wt %) | C 0 |
| | SiO₂ 0.04 |
| Crystallite size at (420) face | 705Å |

EXAMPLE 7

100 g of silica powder as the siliceous material, 56 g of carbon black as the carbonaceous material, 4 g of novolac type phenol resin and 0.03 g of alkali catalyst were mixed. When put under pressure on a hot plate for about one hour, they were solidified. The thus obtained solid product was heated to a temperature of 1000° C. at a rate of 10° C./min in a non-oxidizing atmosphere. When the thus obtained carbonized product was analyzed for carbon, C/Si atomic ratio was 2.9.

When the carbonized product was fired in a non-oxidizing atmosphere at 1900° C. for 30 minutes, β-SiC powder having the following properties was obtained.

| | |
| --- | --- |
| True specific gravity | 3.19 g/cm³ |
| Crystal form | β-type |
| Impurities (wt %) | C 0.8 |
| | SiO₂ 0.08 |
| Crystallite size at (420) face | 690Å |

From the result of the examples and comparative examples, the following facts are obtained.

There is an optimum condition for the atomic ratio C/Si between C and Si in the starting materials for use in the production of β-SiC and it is necessary that the ratio C/Si is smaller than 3 so that no carbon remains as impurities in the SiC product. For the most efficient production, it is necessary that the ratio C/Si is greater than 2.1 and a particularly desirable effect can be obtained in the case where the ratio lies in the range: $2.4 \leq C/Si \leq 2.8$.

Further, in order to obtain a sintered product with a sufficiently high density (greater than 3.0 g/cm³) using a less addition amount of the additive, it is necessary that the degree of crystallization of SiC powder is greater, that is, the crystallite size is larger. In order to synthesize the powder having large crystallite size, the reaction temperature for SiC production has to be higher than 1750° C. All of the SiC powders synthesized under the high temperature condition according to this invention have great crystallite sizes of more than 500 Å at the (420) face and the density of the sintered product obtained from the powders is always extremely high as more than 3.0 g/cm³. If the reaction temperature exceeds 2100° C., the grains grow remarkably to provide undesired effect on the subsequent pulverization process, which is economically undesirable.

By the way, in the above examples, since deposits of SiO gases were observed at a lower temperature portion of the by-produced gas processing device in the by-produced gas processing chamber of a lateral type pusher furnace, it was confirmed that intrusion of by-produced gases into the resultant β-SiC powder can effectively be prevented due to the presence of the by-produced gas processing chamber and, accordingly, β-SiC powder of high purity can be obtained.

As has been described above specifically, the method of producing β-silicon carbide according to this invention is a novel method of synthesizing β-SiC powder having crystallite size of more than 500 Å by sintering a starting mixture having a C/Si atomic ratio within a range: $2.1 < C/Si < 3.0$ at a temperature of 1750° to 2100° C. in a device capable of eliminating by-produced gases out of the system, in which easily sinterable β-SiC of an extremely high purity can be obtained by the reaction in a short period of time. Then, the thus obtained powder can be prepared into an extremely dense sintered product upon sintering. Further, the addition amount for the additive such as boron required for sintering can be extremely small and the property of the thus obtained sintering product at high temperature can be improved owing to the reduced amount of the additive. Silicon carbide can thus be produced at a reduced cost according to this invention, which is extremely useful industrially also in economical point of view.

What is claimed is:

1. A method for producing substantially pure β-silicon carbide powder having a crystallite size of at least 500 Å, which comprises:
   heating a mixture containing siliceous material and carbonaceous material having a C/Si atomic ratio of $2.1 \leq C/Si \leq 3.0$ in a non-oxidizing atmosphere at a temperature of about 1750° C. to 2100° C. in a reaction furnace having a separate chamber disposed laterally to the reaction furnace; and removing by-product gases containing impurities from the reaction chamber and introducing them into the laterally disposed separate chamber during said heating step thereby obtaining in the reaction chamber substantially pure $\beta$-silicon carbide powder having a crystallite size of at least 500 Å in which impurities contained in the by-product gases are removed from the reaction chamber.

2. The method of claim 1, wherein the by-product gases contain Si, $SiO_2$ or a mixture thereof as impurities.

3. The method of claim 1, wherein the siliceous material is selected from the group consisting of silica rock, silica sand, quartz sand, molten silica, silica powder, amorphous silica, liquid silica, ethylsilicate and mixtures thereof.

4. The method of claim 1, wherein the carbonaceous material is selected from the group consisting of carbon black, coal, coke, synthetic hydrocarbon resin, natural graphite, petroleum, coal powder, tar pitch, petroleum pitch, phenol resin, furan resin, polyimide, polyurethane, polyacrylonitrile, cellulose, sucrose and mixtures thereof.

5. The method of claim 1, wherein the siliceous material and the carbonaceous material are uniformly mixed so that the mixture is homogenized prior to formation of SiC.

6. The method of claim 1, wherein the C/Si atomic ratio is $2.4 \leq C/Si \leq 2.8$.

7. The method of claim 1, wherein the temperature in the reaction furnace is 1800° to 2000° C.

8. The method of claim 1, wherein the non-oxidizing atmosphere contains gases selected from the group consisting of helium, argon, carbon monoxide and mixtures thereof.

9. The method of claim 8, wherein the gases in the non-oxidizing atmosphere flow from the reaction furnace to the laterally disposed separate chamber thereby promoting removal of the by-product gases.

* * * * *